(12) United States Patent
Shulha (10) Patent No.: US 10,244,391 B2
(45) Date of Patent: Mar. 26, 2019

(54) SECURE COMPUTER FILE STORAGE SYSTEM AND METHOD

(71) Applicant: Cloud-Clout, LLC, North Palm Beach, FL (US)

(72) Inventor: Yevhenii Shulha, Brovary Town (UA)

(73) Assignee: Cloud-Clout, LLC, North Palm Beach, FL (US)

(*) Notice: Subject to any disclaimer, the term of this patent is extended or adjusted under 35 U.S.C. 154(b) by 94 days.

(21) Appl. No.: 15/074,696

(22) Filed: Mar. 18, 2016

(65) Prior Publication Data

US 2016/0277185 A1    Sep. 22, 2016

Related U.S. Application Data

(60) Provisional application No. 62/135,395, filed on Mar. 19, 2015.

(51) Int. Cl.

| | |
|---|---|
| *H04L 9/00* | (2006.01) |
| *H04W 12/04* | (2009.01) |
| *H04W 12/06* | (2009.01) |
| *H04L 9/32* | (2006.01) |
| *H04L 29/06* | (2006.01) |
| *G06F 21/62* | (2013.01) |

(52) U.S. Cl.
CPC ........ *H04W 12/04* (2013.01); *G06F 21/6218* (2013.01); *H04L 9/3226* (2013.01); *H04L 63/0428* (2013.01); *H04L 63/06* (2013.01); *H04W 12/06* (2013.01); *H04L 63/083* (2013.01)

(58) Field of Classification Search
CPC ... H04L 63/06; H04L 63/083; H04L 63/0428; H04W 12/04; H04W 12/06; G06F 21/6218

See application file for complete search history.

(56) References Cited

U.S. PATENT DOCUMENTS

| | | | |
|---|---|---|---|
| 8,145,837 B2* | 3/2012 | Ballew | G06F 11/2094 711/113 |
| 2008/0130890 A1* | 6/2008 | Rigler | G06F 21/6209 380/259 |

* cited by examiner

*Primary Examiner* — Beemnet W Dada
(74) *Attorney, Agent, or Firm* — McHale & Slavin, P.A.

(57) ABSTRACT

A computer file storage system and method are provided. The system and method include means for separating a file into components, encrypting each of those components and storing them on different cloud storage systems. Suitable security steps are provided to effect the encryption and access to the file components. When retrieval of the file is desired, the system will find the various file components and decrypt the components and reassemble them into the original file format.

7 Claims, 14 Drawing Sheets

SECURE COMPUTER FILE STORAGE SYSTEM AND METHOD

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/135,395, entitled "SECURE COMPUTER FILE STORAGE SYSTEM AND METHOD", filed Mar. 19, 2015. The contents of the above referenced application is incorporated herein by reference in its entirety.

FIELD OF THE INVENTION

The present invention relates to a computer file storage system that utilizes a programmed computer system to receive and store files in a secure manner. The invention also relates to an improved method of securing files during storage on the storage medium referred to as the cloud.

BACKGROUND OF THE INVENTION

The present invention relates to a computer file storage system and method that enhances the security of the stored file during off-site storage, such as on the cloud.

Currently, there are two major ways of protecting files from being accessed or hacked by unauthorized people. One is the use of a password or biometric protection which is usually accompanied by a user name. If someone wanting to access a file does not know the password and/or user name, the computer system will not allow access to the file. While somewhat effective, skilled hackers can find ways to bypass this protection and gain access to protected files. Such systems, though, are typically used in low security requirements systems, for example, a data storage system shared by a company or office environment.

Another form of protecting computer files is the use of encryption, either alone or in combination with password or biometric protection. Usually both are used in combination. Encryption is well known in the art; but even encryption, as effective as it is, can still be deciphered, exposing the file content to unauthorized people.

What is needed is an improved system and method for securing files, particularly those that are stored in public storage such as cloud storage.

SUMMARY OF THE INVENTION

The present invention involves the provision of a computer system that is programmed to secure computer files for enhanced security when the files are to be stored on publicly accessible storage devices, for example, cloud storage. Such files are typically digital in form.

The present invention also involves the provision of a method for effecting higher security storage of files on publicly accessible digital information storage devices. The method includes dividing the file into multiple components and storing each of the components on separate information storage devices in encrypted form. The method also includes the ability to recall the file and have the system reassemble it in its original form.

Thus, it is an objective of the present invention to provide a computer system for securing files in digital form on public type storage facility.

It is another objective of the present invention to provide a method of securely storing digital files on a cloud type storage facility.

It is yet another objective of the present invention to provide a method of securing digital files on the cloud that involves dividing the files into multiple components which are stored on different cloud databases.

It is still yet a further objective of the present invention to provide a method of securing digital files on the cloud that encrypts the multiple components of the files for storage on separate cloud databases.

It is an even further objective of the present invention to provide a method of securing digital files on the cloud that encrypts the multiple components of the files for storage on separate cloud databases in different forms of encryption.

Still yet a further objective of the present invention is to provide a method of securing digital files on the cloud that can reassemble the parts of the divided and encrypted files into its original form upon identification of the person requesting the file.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 2:
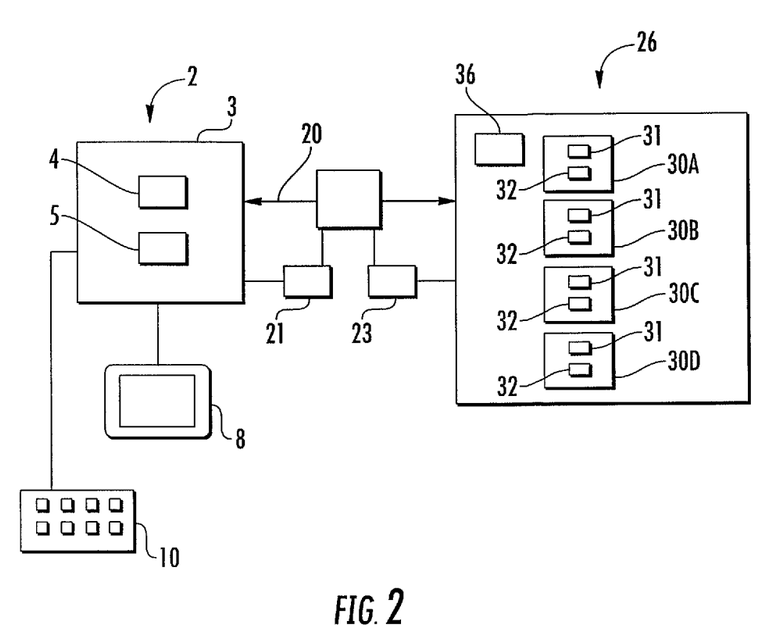
FIG. 2 is a schematic illustration of the programmed computer system of the present invention.

Referring now to FIG. 2, this invention includes a computer system, designated generally 2, which includes a computer 3 having memory and/or storage devices, designated generally 4, and a digital processor 5. The computer system 2 can include a display device 8, such as a monitor or other form of visual screen or display. The computer system 2 also includes an input device 10 which is connected to the computer system 2 as is known in the art, such as a keyboard, mouse or touch screen. Such computer systems 2 are well known in the art. They can be in the form of a desktop computer, laptop computer, pad, tablet, smart phone or the like. The computer system 2 is operable to perform certain functions in accordance with preprogrammed instructions and instructions from an operator of the computer system 2. The functions of the computer system 2 are described below. The computer system 2 is configured to provide an output 20 which can be in the form of a wired connection output or a wireless output as are well known in the art. The wireless output can be via a transmitter 21, such as a Wi-Fi or Bluetooth form of output device. The data or information output from the transmitter 21 can be received by a wireless receiver 23 connected to a system forming a cloud storage system 26, or cloud system 26 or cloud 26 as referenced hereinafter.

The cloud system 26 as seen in FIG. 2 can be of a public type or private type as are known in the art. Such cloud systems can be used for information storage and/or as a programmed computing system. Such systems are well known in the art and are available from sources such as Amazon, Microsoft, Google, Yandex and the like. Thus, in the illustrated embodiment, the computer system 2 can have portions thereof on the cloud system 26. Access to the programmed computer system of the present invention can be via an Internet connection, or an individual's computer can have software residing thereon adapted to perform the below described functions.

It is to be understood that the computer 3 can optionally be programmed to perform the below described functions, and the cloud system 26 can function as an information storage device. In this case, the cloud system 26 has a plurality of information storage servers designated 30A-D, designated collectively as 30. Each server 30 will have a data storage device, such as a memory and/or storage 31, and a processor 32. The memory and/or storage, as examples, can be RAM, a solid-state memory device, or a hard drive. In this described embodiment, the cloud system 26 will function as a data storage device into which information or data can be input and recalled as described below.

The computer 3 is programmed to receive instructions from a user regarding the input and processing of a computer file. The computer file can contain information such as text, numerical data, pictures, drawings or any other form of information. The files can be in any known format such as PDF, JPEG, .doc and the like, as are known in the art.

Cloud systems 26 are well known in the art and can be a public cloud or a private cloud. The cloud is, in essence, a system that can be used to store digital information and/or can be used as a remote computer system. In the illustrated structure, the cloud system 26 can include a plurality of servers 30A-D. Any number of servers can be provided; four are shown for convenience. Each server 30 can be provided by a separate data storage provider company, such as those provided by Microsoft, Google, Amazon and Yandex. In the practice of the present invention, it is contemplated that the cloud system 26 can include a software service accessible by the computer system 2 operable to perform the herein described functions. In the illustrated structure, each of the servers 30 include data or information storage devices 31 that can be a hard drive, solid state device and/or RAM. Such data storage devices are well known in the art, and are often referred to as memory or storage. The servers 30 can also include a digital processor 32 as are known in the art. Optionally, and as illustrated, the cloud system 26 can include a computer system 36, such as a server or virtual server similar to the computing device or computer 3. The programming used to practice the present invention can reside on either the computer 3 or computer system 36, and preferably the computer system 36.

Figure 3:
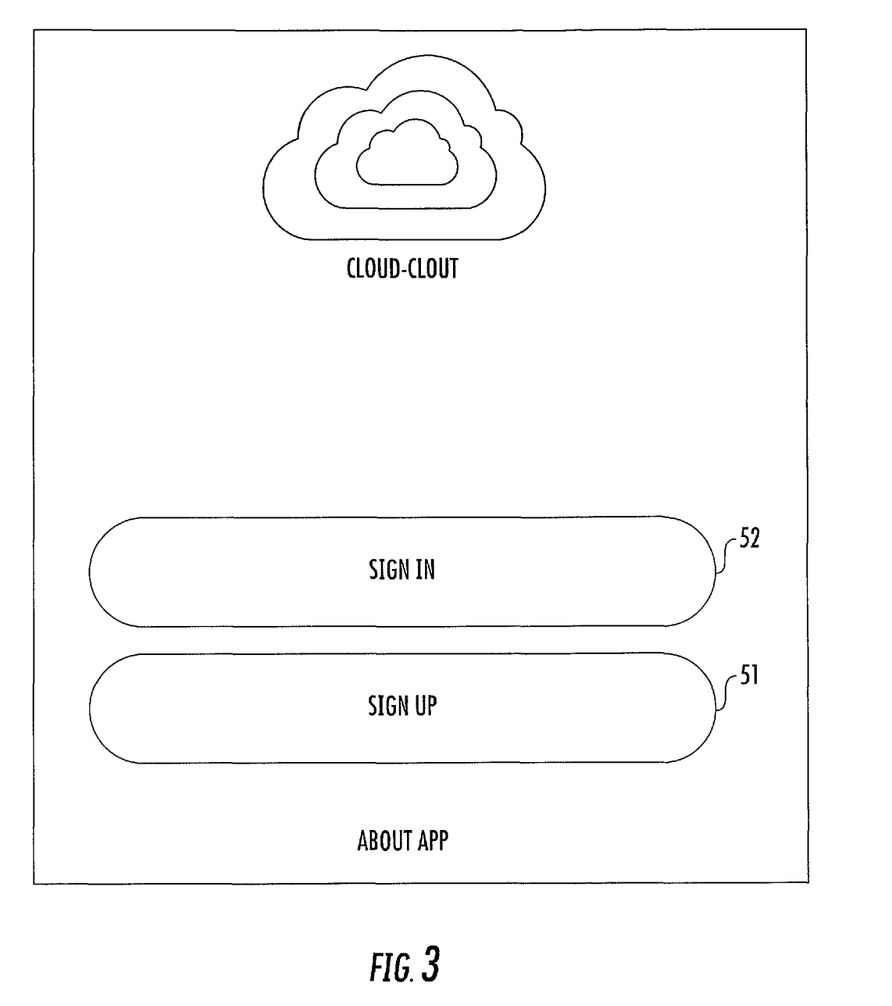
FIG. 3 is an illustration of a first screen shot illustrating a program opening screen.
Figure 4:
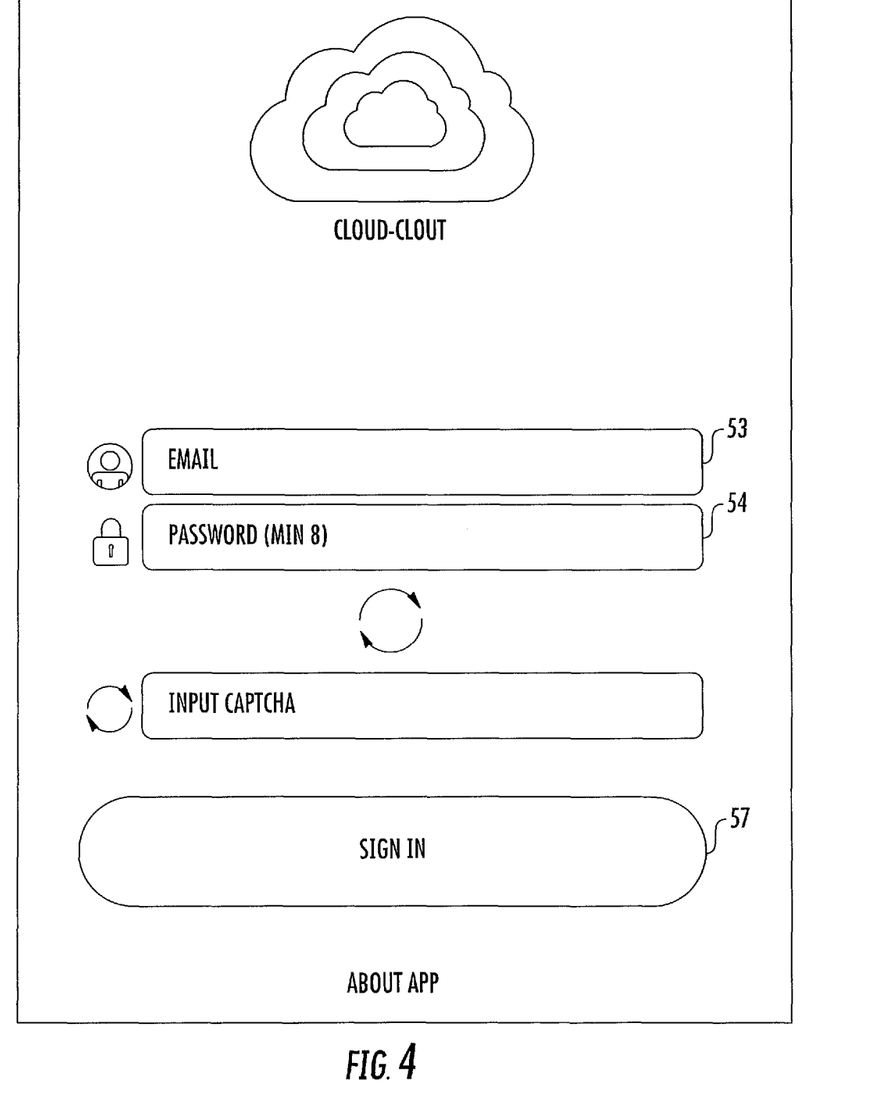
FIG. 4 is an illustration of a second screen shot showing a first sign in page for initiating operation of the programmed computer system.
Figure 5:
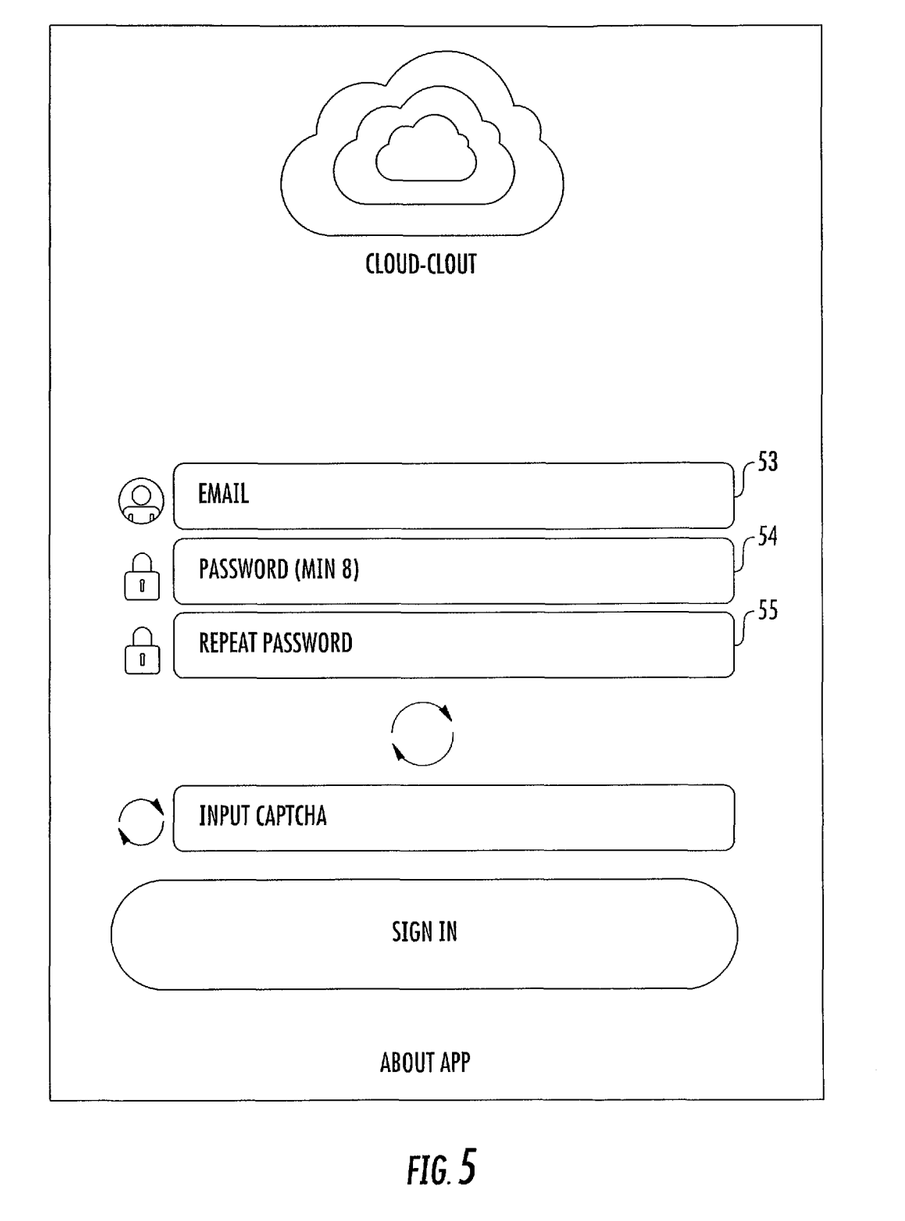
FIG. 5 is an illustration of a third screen shot showing a second sign in page for initiating operation of the programmed computer system.
Figure 6:
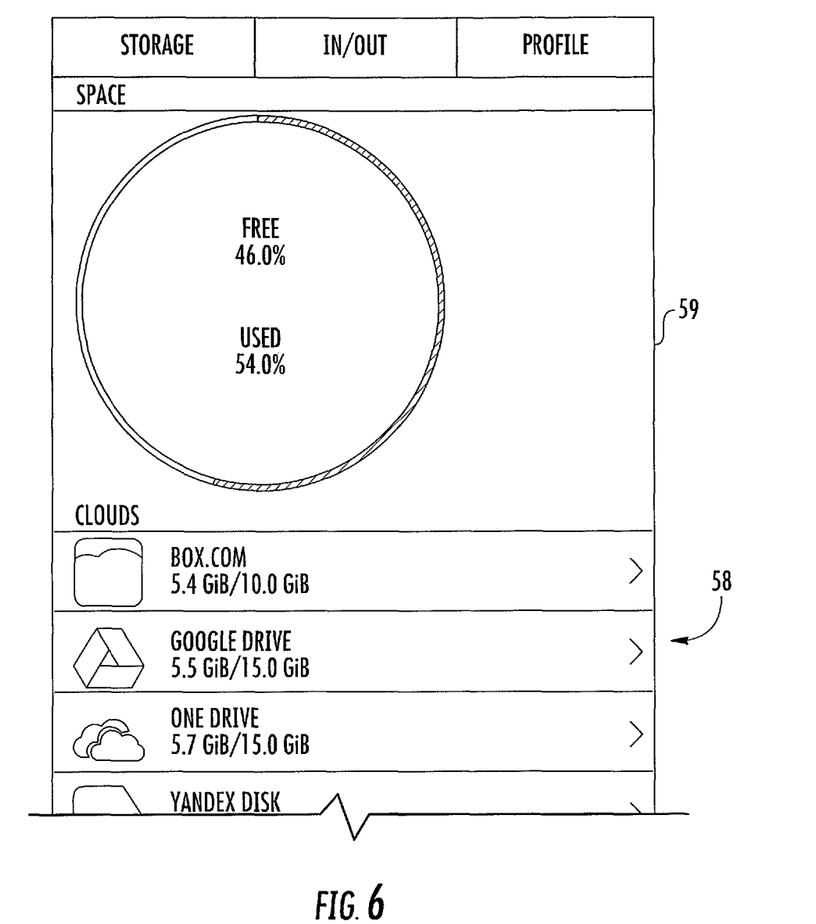
FIG. 6 is an illustration of a fourth screen shot illustrating data storage capacity and available cloud storage services.

In operation of the present invention, a user can sign up to use the service as seen in the screen shot of FIG. 3 at 51. To sign up, a user will identify himself using at least one security device, as with an email address, and provide an appropriate password or passwords or other form of acceptance identification, such as biometric information. After the sign up, the user can then utilize the information storage system as described herein. To utilize the system, the user will sign in as at 52, FIG. 3. The sign in will prompt for identification of the user, for example, as shown in screens in FIG. 4 and FIG. 5. The user identifiers, such as the user's email and password, and optionally repeat password, as seen in FIGS. 4, 5 are at 53, 54, and 55 respectively. Once the data is entered, the user can finish the sign in by clicking on, or otherwise activating, a sign in icon 57. After signing in, a screen will be presented, such as that in FIG. 6, showing available cloud systems and percentage of space that the user has available on those cloud systems, as at 58 and 59 respectively.

Figure 7:
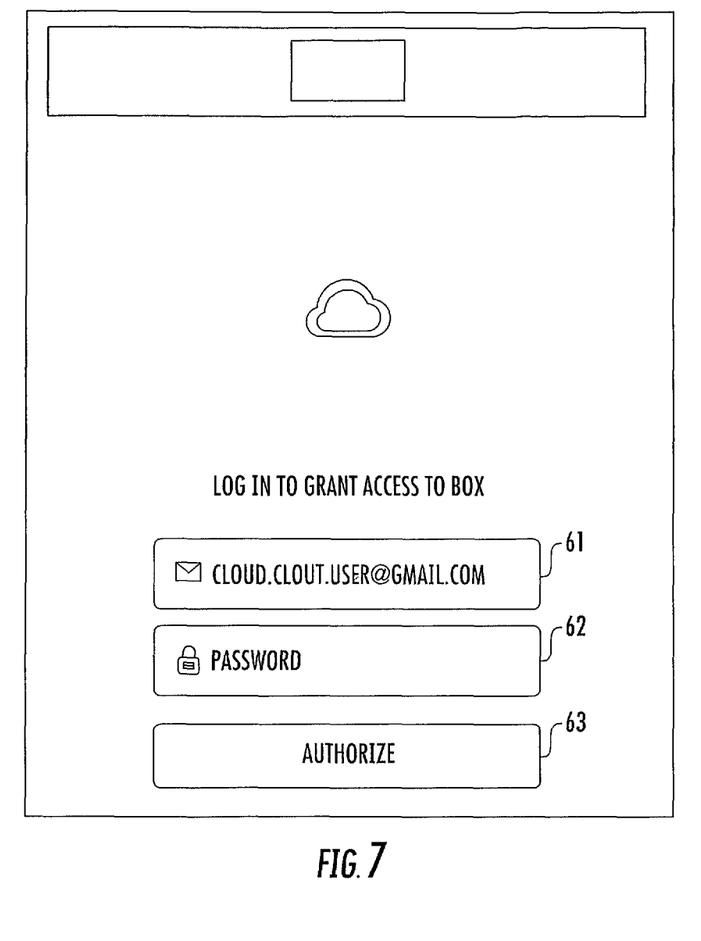
FIG. 7 is an illustration of a fifth screen shot showing a sign in page for initiating cloud access.
Figure 8:
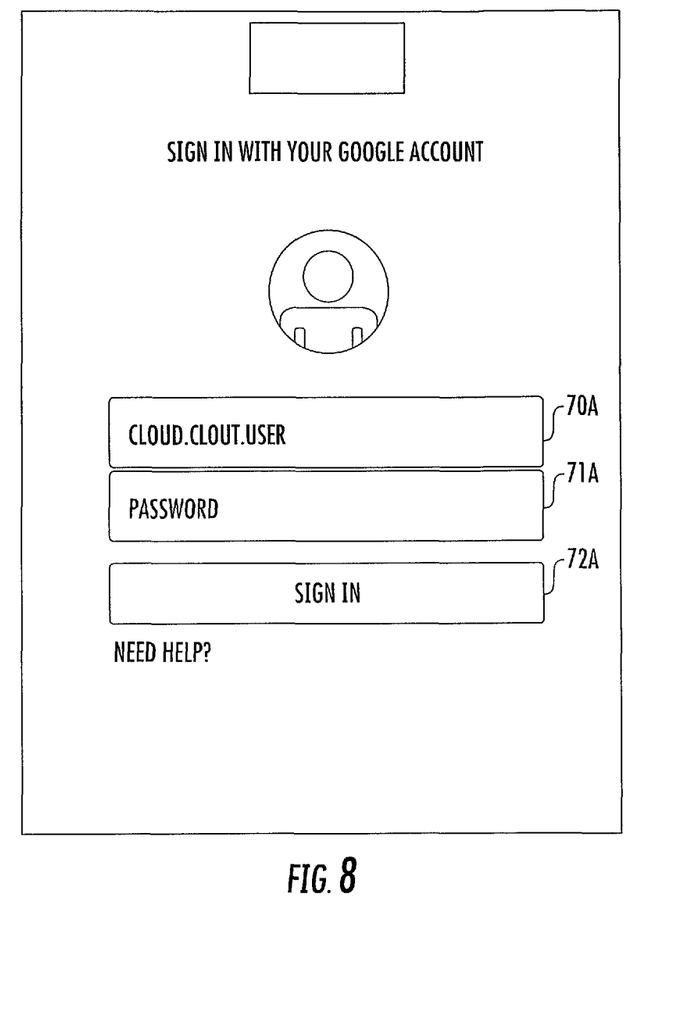
FIG. 8 is an illustration of a sixth screen shot showing a first sign in page for a first cloud data storage system.
Figure 9:
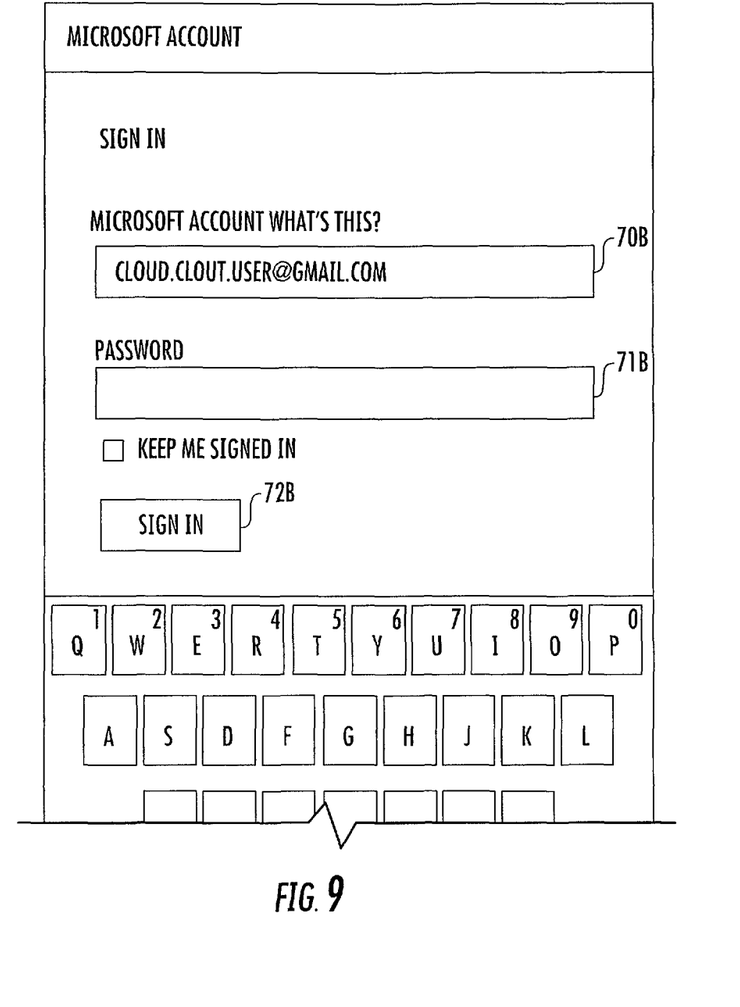
FIG. 9 is an illustration of a seventh screen shot showing a second sign in page for a second cloud data storage system.
Figure 10:
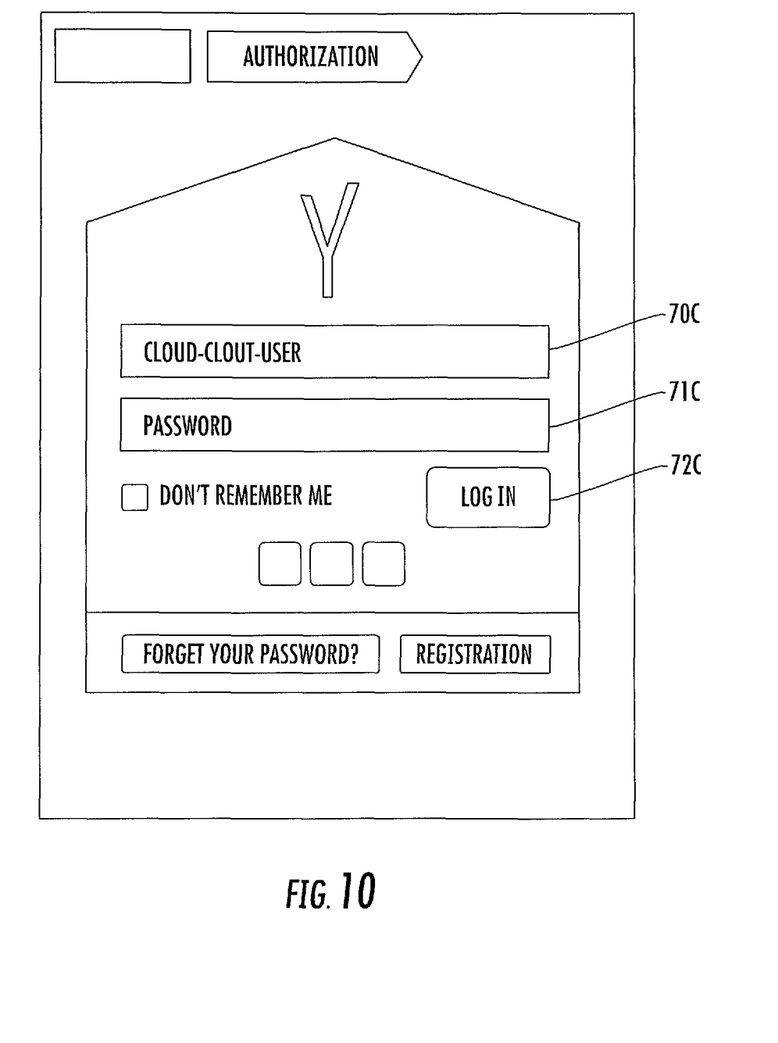
FIG. 10 is an illustration of an eighth screen shot showing a third sign in page for a third cloud data storage system.
Figure 11:
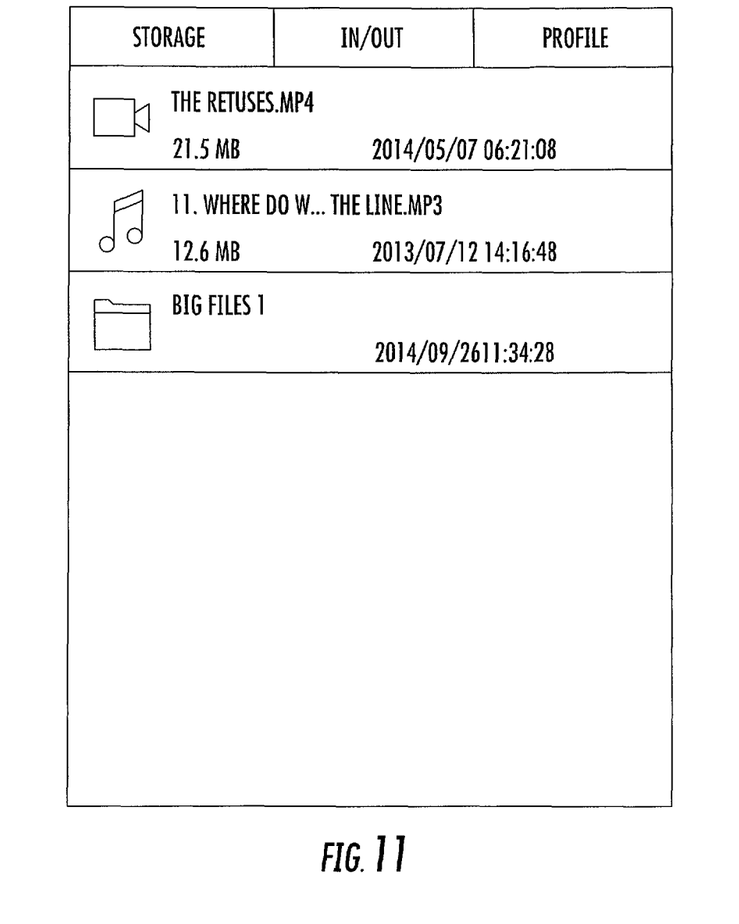
FIG. 11 is an illustration of a ninth screen shot showing a selection menu for type of file to be uploaded.

After signing in, the user is preferably presented with another screen as seen in FIG. 7. This provides a second layer of sign in security. By entering data, such as a user ID at 61 and a password at 62, the user can then activate an authorize icon 63 by clicking on or touching depending upon the type of data input device the user has. Once the authorization is achieved, the user has access to cloud service providers as seen in FIGS. 8, 9, 10 and 12. FIGS. 8-10 are sign in screens for various cloud service providers, and will have sign in protocols to access those service facilities. Those protocols will preferably include a username, a password, and an activation icon as at 70A-C, 71A-C and 72A-C respectively.

Figure 12:
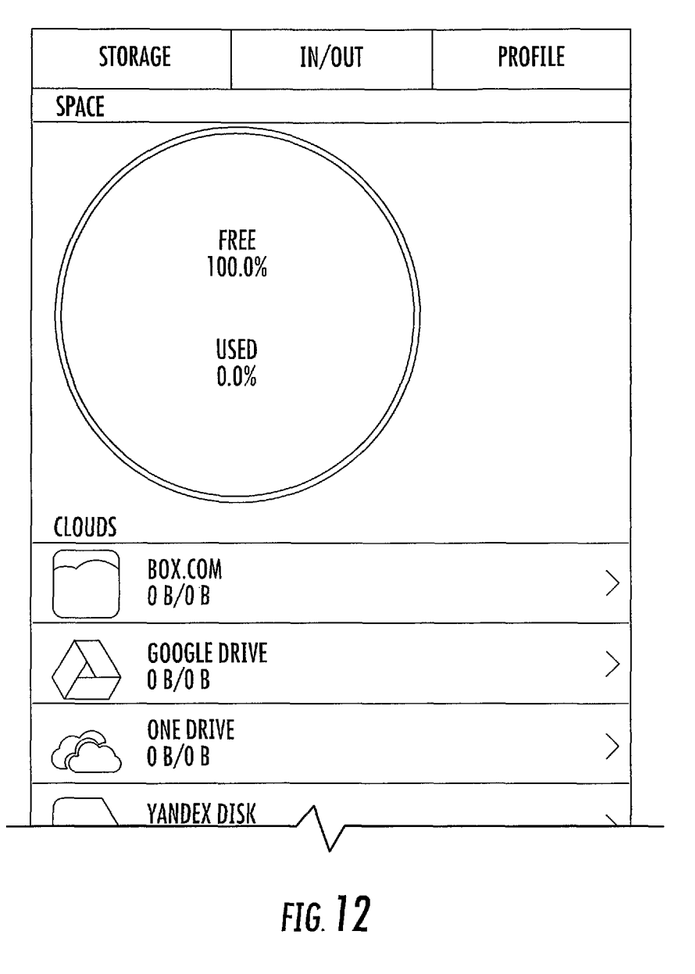
FIG. 12 is an illustration of a tenth screen shot showing the amount of data stored for each cloud storage system.

Once signed in and having obtained access to the computer system 36 and services, the user will select a file for storage in the cloud 26. The file is then processed for transmitting to the cloud system 26, as described below, and then transmitted and stored. After storing, an information containing screen, such as seen in FIG. 12, can be provided to the user showing the user's storage capacity and usage on the various cloud services. The processing is done by whichever computer system 2 or 36 is programmed to accomplish the processing, which is preferably the computer system 36.

Figure 1A:
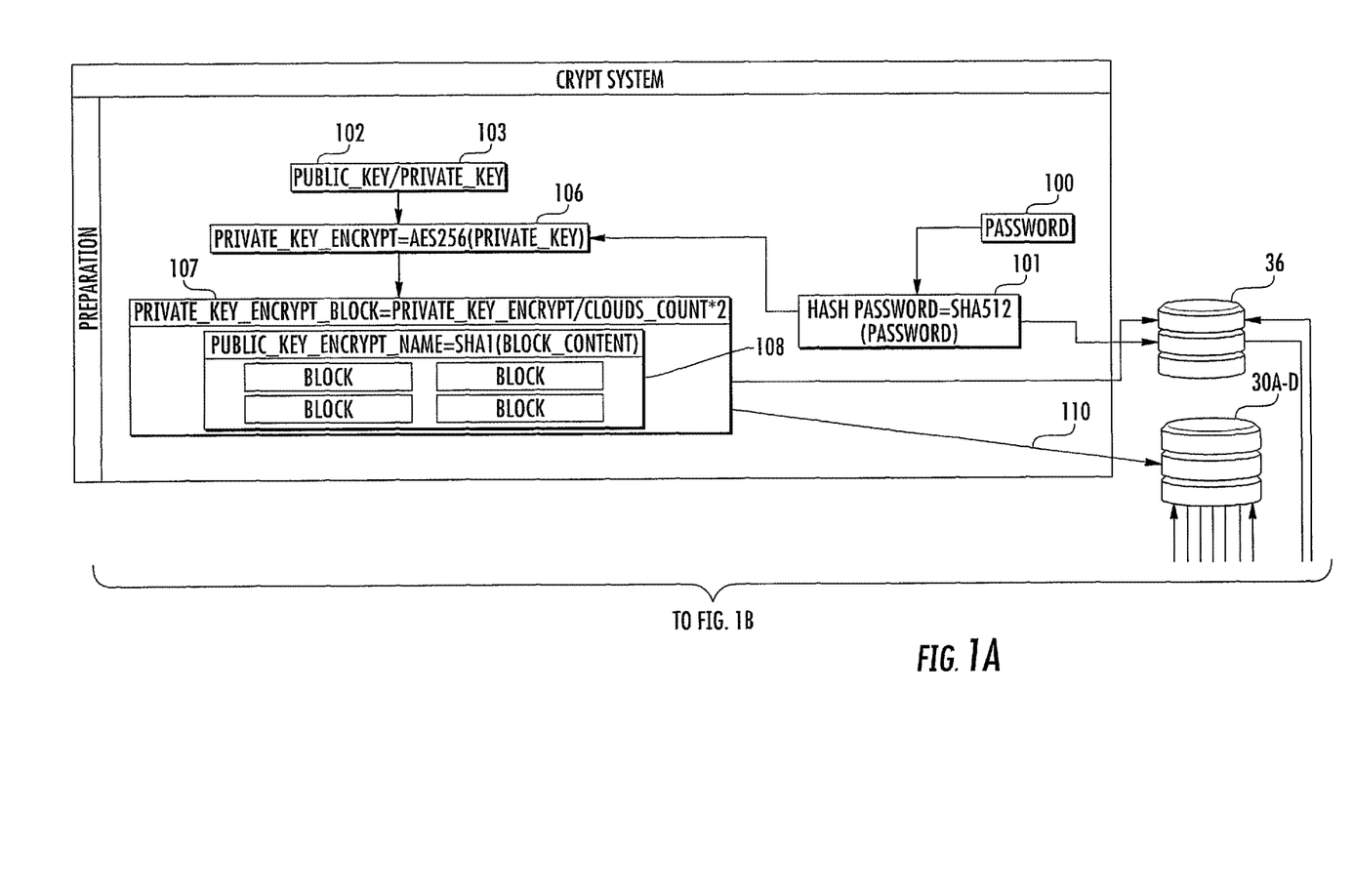
FIGS. 1A, 1B, and 1C are a flowchart showing the operation of the present invention.
Figure 1B:
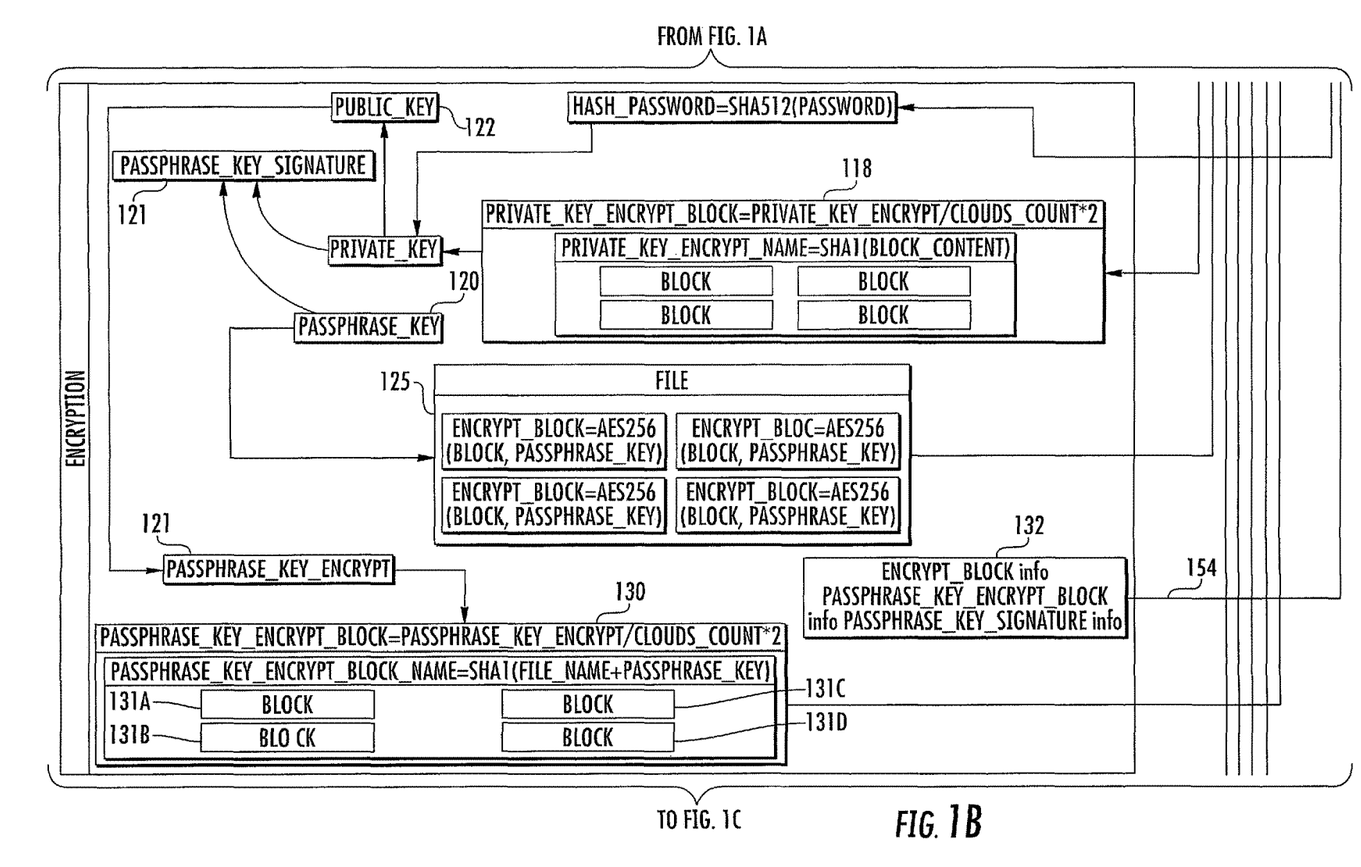
Figure 1C:
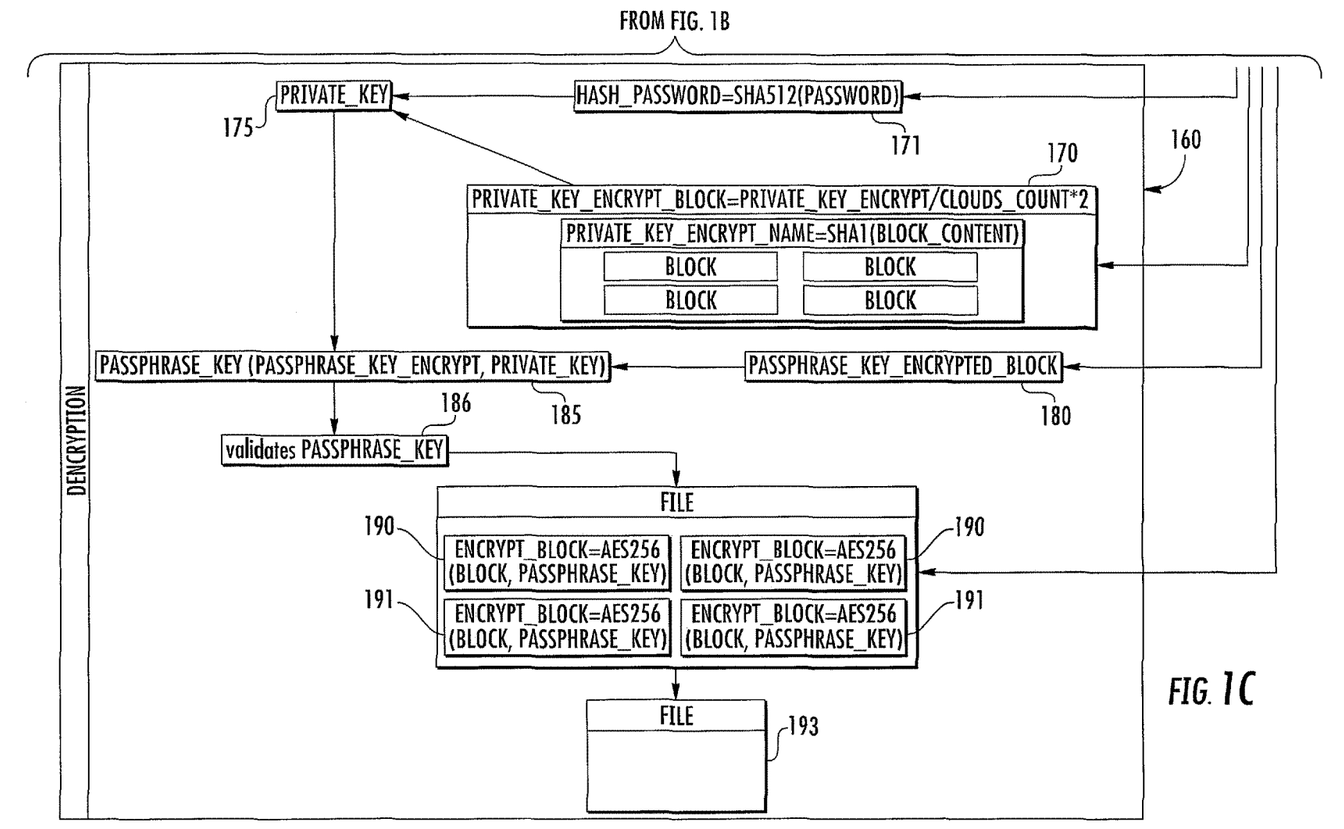

Referring now to FIGS. 1A-1C, the user selects a file for transmission to the cloud 26 for secure storage. The file can be a single document, such as a Word document, or a folder with several documents. The user first creates a password at 100 during registration for use of the cloud storage system 26. After initial registration, this step can be dispensed with for subsequent uses of the cloud storage system. The application creates a hash of the user's password (HASH_PASSWORD) at 101 by means of a suitable algorithm such as "sha512". The application can also create a hash of the user's name (HASH_USERNAME=SHA512(USERNAME)) at 101 by means of a suitable algorithm such as "sha512". The user calculates (HASH_PASSWORD_SALT=SHA512(SHA512(USERNAME).SHA512(PASSWORD)) and sends it to a virtual server of the computer system 36. As hereinafter described, the invention will be described in terms of the computer system 36 being the programmed computer system operable for performing the herein described encryption and decryption functions, and file separation and reconstruction. It is to be understood, however, that either the computer system 2 or 36 can be the programmed computer system. The application generates security devices such as a public key 102 (also PUBLIC_KEY) and a private key 103 (also PRIVATE_KEY) using a suitable algorithm such as "RSA4092". The public and private keys 102, 103 can be RSA keys, as are known in the art. The given algorithm can be applied not only to the virtual cloud's storages, but also on tangible media, such as SDD, HDD and any other.

The application encrypts, at 106, the private key 103 by means of a suitable algorithm such as AES256 using the HASH_PASSWORD_SALT 101 as an encryption key. The application splits, at 107, the encrypted private key 103 into count*2 quantity blocks, at 108, and generates a name for each of these blocks by means of a suitable algorithm such as "sha1".

At 110, the application sends the blocks 108 of encrypted private key to the user's accounts of various cloud service providers. Each block is sent to two different cloud providers 30A-D in order to provide redundancy. At 110, the application sends information about the blocks, i.e. a map of their locations, to the above-mentioned virtual server at 36.

The application downloads blocks of encrypted private key, PRIVATE_KEY_ENCRYPT_BLOCK from the user's accounts on the cloud storage 30A-D at 118. The application then concatenates these blocks and decrypts them by use of a suitable algorithm, such as an "AES256" algorithm, and uses the HASH_PASSWORD_SALT as an encryption key (PRIVATE_KEY_ENCRYPT) into the original PRIVATE_KEY created at 101.

The application will generate a random password 120, preferably a string of 32 symbols to create a PASSPHRASE_KEY.

The application can split the file into blocks, at 125, and encrypt each of the blocks by means of a suitable algorithm, such as an "AES256", using the PASSPHRASE_KEY generated at 120. The size of each block can be either calculated on computer system 2 or it can be obtained from computer system 36.

The application will also create a digital signature, PASSPHRASE_KEY_SIGNATURE, to the PASSPHRASE_KEY by means of an RSA algorithm and the private key 103 and create a password signature at 121.

The application also generates a PUBLIC_KEY at 122 from the PRIVATE_KEY generated in steps 103. This can be accomplished using a suitable algorithm such as an RSA algorithm. The application will encrypt, at 130, the PASSPHRASE_KEY from step 120 also by use of a suitable algorithm, such as an RSA algorithm and PUBLIC_KEY (PASSPHRASE_KEY_ENCRYPT). The application will split the PASSPHRASE_KEY_ENCRYPT into the blocks of step 108. The application will generate a file identifier name for each of these blocks, preferably by means of a suitable algorithm, such as a "sha1" algorithm, to form a PASSPHRASE_KEY_ENCRYPT_BLOCK_NAME=SHA1 (FILE_NAME+PASSPHRASE_KEY). Upon file retrieval, the file identifiers identify the location of a block relative to at least one other block and will be used to reassemble the file blocks in appropriate pre-separation order to recreate the original file.

At 130 the user adds a file for encryption and storage and the file is split into blocks, for example 131A, 131B, 131C and 131D. The separation of the file can be random as instructed by the programming of the computer system 36, or the user can assist in the separation, or control the separation, of the file manually. This choice for separating the file can be determined in accordance with the information contained within the file. The application will also send identifier information about the file, the file's metadata, for example the map of location of the file's blocks, map of location of the blocks of encrypted key and a digital signature of a PASSPHRASE_KEY (PASSPHRASE_KEY_SIGNATURE) in a suitable format, such as JSON. Any suitable number of blocks can be utilized as long as there is a plurality. Each of the blocks 131A-D is encrypted as at 132. The encryption can be by any suitable encryption algorithms, such as AES256. The PASSPHRASE_KEY generated at 120 is used as an encryption key of a suitable bit size, as for example 256 bits. The application sends each encrypted block of the selected file, PASSPHRASE_KEY_ENCRYPT_BLOCK, to user's accounts on the cloud storage as at 30A-D, FIG. 2. The application sends information about the file, the file's metadata, map of location of the file blocks, ENCRYPT_BLOCK, map of the location of the blocks 131 of encrypted key, PASSPHRASE_KEY_ENCRYPT_BLOCK, and a digital signature of a PASSPHRASE_KEY (PASSPHRASE_KEY_SIGNATURE) in a suitable format such as JSON.

The application can then send the encrypted file blocks of 132 to the user's accounts at the various separate cloud storage service providers as at 154. The computer system 36 will store information regarding how the file was separated in order to reassemble the file when retrieved from the various cloud storage services.

The subject file has been separated into blocks and stored on the cloud at various storage services in encrypted format, accounts have been established and password security established for access as described above. Input file processing and security are finished for storage. Retrieval of a file from its storage can be accomplished at any subsequent time as selected by the user, as shown at 160.

To retrieve the file portions sent to the cloud, the application downloads the blocks 131 of encrypted key PRIVATE_KEY_ENCRYPT_BLOCK from the user's accounts on the various cloud storage services using a map of their location stored on the virtual server, as at 170. The application then concatenates the downloaded blocks and decrypts them by means of a suitable algorithm, such as an AES256, and using the HASH_PASSWORD_SALT 171 generated at 118, described above, as an encryption key and converting PRIVATE_KEY_ENCRYPT into the original PRIVATE_KEY, as at 175.

The application will download the blocks of encryption key PASSPHRASE_KEY_ENCRYPT_BLOCK from the user's accounts on the various cloud storages used, as at 180. The application then concatenates these blocks and decrypts them by means of an RSA and PRIVATE_KEY from steps 170, 171 and 175 into the original PASSPHRASE_KEY (RSA(PASSPHRASE_KEY_ENCRYPT, PRIVATE_KEY)) at 185.

The application validates the PASSPHRASE_KEY, as at 186, by means of an RSA encryption algorithm and digital signature PASSPHRASE_KEY_SIGNATURE from step 121.

The application downloads the file blocks ENCRYPT_BLOCK from step 132 from user's accounts on the various cloud storage services using a map of the locations of the blocks stored on the computer system 36 at 190.

The application decrypts, at 191, the file blocks 131 by means of a suitable algorithm, such as an AES256 algorithm, and the encryption key PASSPHRASE_KEY from step 180. The application then concatenates the retrieved file blocks into the original file order at 193.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The invention claimed is:

1. A method of securely storing a file, the method comprising:

selecting a file for storage;

separating the file into a plurality of blocks using a computer system;

sending each of the blocks to separate selected servers on a cloud system with at least one of the blocks being sent to a server on each of a plurality of cloud systems providing redundant storage therefor;

showing a user's available storage space on each of the cloud systems prior to said sending;

encrypting each of the blocks and creating at least one security device for each said block to limit access to each said block;

creating an identifier for each block as to its storage location and its position in the file relative to at least one other said block;

storing said blocks each on the respective selected server;

requesting recall of each of the blocks utilizing a security device; and having a programmed computer system decrypt the recalled blocks and reassemble the decrypted blocks into the original file.

2. The method of claim 1 wherein said security device including a plurality of keys operable to effect decryption of a respective said block.

3. The method of claim 2 wherein said keys include a public key and a private key.

4. The method of claim 1 wherein the separating of the file into a plurality of blocks is accomplished in accordance with an algorithm programmed into the computer system.

5. The method of claim 4 wherein the computer system is part of the cloud system.

6. The method of claim 4 wherein the separating of the file is accomplished randomly.

7. The method of claim 2 wherein the security device includes at least one password operable to selectively provide access to the cloud system.

* * * * *